Patented Aug. 22, 1950

2,520,076

UNITED STATES PATENT OFFICE 2,520,076

PROCESS FOR SEPARATING AND RECOVERING GLOBULINS FROM BLOOD PLASMAS

John W. Williams and Harold F. Deutsch, Madison, Wis., assignors to the United States of America as represented by the Secretary of War No Drawing. Application July 18, 1947,
Serial No. 761,988

4 Claims. (Cl. 260—112)

This invention relates to a method of recovering serum gamma globulin and, more particularly, to the application of this method to the recovery of gamma globulins from certain by-product fractions obtained from the process of preparing normal human serum albumin.

The large scale separation of the albumin fraction from human blood plasma for use as a blood substitute and in the treatment of shock has made available, as by-products, the serum globulins. In one large fraction, which is known as Fractions II+III, there are separated some of the beta and practically all of the gamma globulins. A number of the antibodies against a variety of pathogenic agents and other antigens are associated with, or actually consist of, gamma globulin. Thus, it becomes of practical importance to separate the gamma globulin from the II+III paste, and industrial procedures have been developed to break this fraction into three subfractions, which are designated at II, III—1 and III—2. Fraction II is called serum gamma globulin (immune). Fraction III—1 contains some gamma globulin in mixture with $\beta$-globulin, and Fraction III—2 is largely $\beta$-globulin, which is rich in prothrombin.

The procedure for obtaining the foregoing fractions does not form a part of this invention, but is set forth below to illustrate the manner in which the required starting materials are produced. This method comprises adding 0.231 liter of 53.3% ethanol to each liter of citrated human plasma at a temperature of from −2° C. to −3° C. to bring the concentration thereof to 10%. At this concentration of ethanol a precipitate forms which consists largely of fibrinogen. This is removed by centrifuging, and 0.530 liter of 53.3% ethanol then is added for each liter of supernatant fluid to bring the ethanol concentration to 25%. The temperature is maintained at −5° C. during this addition, and a precipitate forms which consists principally of beta and gamma globulin. The precipitate is designated as Fraction II+III and is recovered by centrifuging. The supernatant fluid may be processed further to recover normal human serum albumin.

In accordance with the process described in the co-pending application of John W. Williams and Harold F. Deutsch, Ser. No. 624,102, filed October 23, 1945, now Patent No. 2,437,060, for Method for Purification of Biological Preparations, it has been found possible to recover an additional fraction containing gamma and beta-two globulins from Fractions II and III residues after the prior removal of the so-called serum gamma globulin anti-bodies, it being shown in the said co-pending application that the conditions pH—5.1, alcohol concentration 17%.

$$\mu=0.010-0.014$$

and temperature of −6° C. were satisfactory to keep the major portion of the gamma globulin in solution, and precipitate the remaining protein consisting largely of beta globulin.

This precipitate or residue is the starting material for the process of the present invention for the recovery of new antibody-rich fractions, which for the purposes of the present description will be described as Fraction A, a mixture of gamma and beta-two globulins;
Fraction $A_1$, beta-two globulin from Fraction A, and
Fraction $A_2$, gamma globulin from Fraction A.

This last fraction, i. e., Fraction $A_2$, has the properties of the standard gamma globulin preparations and although it may be mentioned that the yield of this protein is increased, it will not be considered further in this description of the process of the present invention.

I. Preparation and properties of Fraction A

The protein residue resulting after the extraction of gamma globulin from Fraction II+III pastes is treated as follows: One kilogram of the paste is suspended in 10.15 liters of 0° C. pyrogen-free water. The pH of the suspension is adjusted to 4.8 (±0.1) with 0.05 M acetic acid or with a pH 4.0 acetate buffer and the system is stirred overnight at 0° C. The pH then is adjusted to 5.1 with 0.05 M di-sodium phosphate and the ethanol concentration brought to 10% by the addition of 53.3% ethanol. The suspension is stirred for one hour at −3° C. after the completion of this ethanol addition. The precipitate then is filtered off in a refrigerated centrifuge and the effluent adjusted to pH 7.65 (±0.05) by the addition of 0.05 M di-sodium phosphate. The alcohol concentration is increased to from 20% to 25% by the addition of 53.3% ethyl alcohol. The final temperature should be −5° C., or lower. The resulting precipitate then is centrifuged off at the above temperature, suspended in cold distilled water, shell frozen, and dried in vacuo.

Residues from Fraction II+III pastes that have been stored for long periods are more successfully extracted for beta-two and residual gamma globulins than are fresh pastes. With such pastes, the preliminary ethanol concentration may be lowered to 6.7%. When applied to fresh II+III pastes, it is difficult to separate by precipitation all of the beta-one globulins in the first precipitation. Thus at 10% ethanol concentration, from 6% to 10% of the protein remaining in solution at pH 5.1 and minimalionic strength will be made up of the beta-one globulin. In the case of the older Fraction II+III pastes, the beta-one globulin is present to an extent which ordinarily does not exceed 5%.

The final product consists of a mixture of proteins containing these small percentages of beta-one globulins with the remainder of the proteins being gamma and beta-two globulins in approximately equal amount. This fraction of the human blood proteins contains most of the antibodies present in normal serum gamma globulin (Fraction II). In addition, there is a greatly enhanced amount of typhoid "O" agglutinin and an increased amount of pertussis antibody. If the starting material is from individuals of a specific blood group, this fraction also contains a major portion of the isohemagglutinins. Several preliminary bood pressure depressor assays by intravenous cat injections on such mixtures have given a negative result.

II.—*Separation of Fractions into $A_1$ and $A_2$*

For this separation, either the dried Fraction A or the paste may be used. This material is treated as follows: One kilo of paste (approximately 250 gms. of protein) is suspended in ten liters of 0° C. water, and 0.05 M acetic acid is added to give a pH of 5.2 ($\pm 0.1$). The solution is stirred for 30 minutes and adjusted to pH 5.5 with 0.05 M disodium phosphate. Sufficient 1 M sodium chloride is added so that after the addition of 53.3% ethanol to give a concentration of 10 to 12%, the ionic strength is approximately 0.01. The 10-12% ethanol solution is stirred approximately 30 minutes at −3° C., and then centrifuged at this temperature. Each kilogram of the resulting precipitate is suspended in 5 liters of 0° C. $H_2O$ and adjusted to pH 7.65 ($\pm 0.05$) with 0.05 M disodium phosphate, and sufficient 1 M sodium chloride solution is added to bring the ionic strength to 0.1. Then the solution is stirred for one to three hours. The insoluble material is removed by centrifuging and discarded. The supernatant liquid is brought to 20% ethanol with cold 53.3% ethanol. The precipitated protein, Fraction A, is centrifuged at −5° C., or lower, suspended in distilled water, shell frozen, and dried in vacuo. The supernatant liquid is discarded.

The supernantant liquid from the system at pH 5.5, $\mu$ 0.01 and 10-12% ethanol is adjusted to pH 7.2 ($\pm 0.2$) with 0.05 M monosodium phosphate. The alcohol concentration is brought to 25% with pre-cooled (−10° C. or lower) 95% ethanol and the precipitate is centrifuged off at −5° C. or lower. The precipitate Fraction $A_2$ is suspended in distilled water, shell-frozen, and dried in vacuo.

The Fraction $A_1$ contains the typhoid "O" agglutinin used in the isohemagglutinins. It has small amounts of influenza −A antibody and diphtheria antitoxin. Fraction $A_2$ has the usual antibody titers of normal serum gamma globulin.

Fraction A may be fractionated into Fractions $A_1$ and $A_2$ if a further concentration of antibodies in Fraction $A_1$ is desirable.

Having thus described our invention, what we claim as new and wish to secure by Letters Patent is:

1. The method of recovering antibody-rich gamma globulins from blood plasmas, which comprises adding ethanol to a citrated plasma until substantially ten per cent ethanol concentration is reached, removing the resulting precipitate, adding ethanol to the supernatant fluid to an ethanol concentration of substantially 25%, while maintaining the temperature of the fluid at approximately −5° C. during addition of the ethanol, separating the resulting precipitate, extracting the precipitate to remove serum gamma globulin therefrom, suspending the resulting residue in pyrogen-free water at substantially 0° C., adjusting the pH value of the resulting suspension to substantially pH 4.8, agitating the resulting material at substantially 0° C., maintaining the material at 0° C. during prolonged agitation therof, adjusting the pH value of the resulting material to pH 5.1, adding ethanol thereto until an ethanol concentration of 10% is reached, stirring the resulting suspension at substantially −3° C., subsequently to this addition of ethanol, separating the resulting precipitate while refrigerating the mixture, adjusting the pH value of the resulting liquid to substantially pH 7.65, adding ethanol until 20% concentration is reached, while maintaining the material at a maximum temperature of −5° C., centrifuging off the resulting precipitate at the said temperature, suspending the resulting separated precipitate in cold distilled water, freezing the resulting mixture, and drying the said mixture in vacuo.

2. The method of recovering antibody rich globulins from blood plasmas, which comprises obtaining a mixture of beta and gamma globulins from a citrated blood plasma, extracting gamma globulins from the said mixture, leaving a residue consisting essentially of beta globulins with some gamma globulins, and obtaining from this residue a mixture of gamma and beta-two globulins by suspending the residue in pyrogen-free water at substantially 0° C., adjusting the pH value of the suspension to substantially 4.8, prolongedly stirring the resulting suspension at substantially 0° C., adjusting the pH value of the stirred suspension to substantially 5.1 with 0.05 M disodium phosphate, bringing ethanol concentration of the suspension to substantially 10% by addition of ethanol, stirring the resulting suspension after completion of ethanol addition at −3° C. for approximately one hour, removing the resulting precipitate, adjusting the pH value of the resulting liquid to substantially 7.65 by addition of 0.05 M disodium phosphate, increasing the alcohol concentration of the resulting liquid to substantially 20% by addition of ethanol, while maintaining the temperature of the liquid at a maximum of −5° C., and recovering the resulting precipitate containing principally gamma and beta-two globulins together with small amounts of beta-one globulins.

3. The method of recovering antibody-rich globulins from blood plasmas, which comprises obtaining a mixture of beta and gamma globulins from a citrated blood plasma, extracting gamma globulins from the said mixture, leaving a residue consisting essentially of beta globulins with some gamma globulins, and obtaining from this residue a mixture of gamma and beta-two globulins by suspending the residue in pyrogen-free water at substantially 0° C., adjusting the pH value of the suspension to substantially 4.8, prolongedly stirring the resulting suspension at substantially 0° C., adjusting the pH value of the stirred suspension to substantially 5.1 with 0.05 M disodium phosphate, bringing ethanol concentration of the suspension to substantially 10% by addition of ethanol, stirring the resulting suspension after completion of the ethanol addition at −3° C. for approximately one hour, removing the resulting precipitate, adjusting the pH value of the resulting liquid to substantially 7.65 by addition of 0.05 M disodium phosphate, increasing the alcohol concentration of the resulting liquid to substantially 20% by addition of ethanol, while maintaining the temperature of the liquid at a maximum of −5° C., and separating by centrifugation the recovered precipitate into fractions consisting essentially of the constituents of the recovered precipitate.

4. The method of recovering antibody-rich globulins from blood plasmas, which comprises obtaining a mixture of beta and gamma globulins from a citrated blood plasma, extracting gamma globulins from the said mixture, leaving a residue consisting essentially of beta globulins with some gamma globulins, obtaining from this residue a mixture of gamma and beta-two globulins by suspending the residue in pyrogen-free water at substantially 0° C., adjusting the pH value of the suspension to substantially 4.8, prolongedly stirring the resulting suspension at substantially 0° C., adjusting the pH value of the stirred suspension to substantially 5.1 with 0.05 M disodium phosphate, bringing the resulting material to an ethanol concentration of substantially 10% by addition of ethanol, stirring the resulting suspension after completion of the ethanol addition at −3° C. for approximately one hour, removing the resulting precipitate, adjusting the pH value of the resulting liquid to substantially 7.65 by addition of 0.05 M disodium phosphate, increasing the alcohol concentration of the resulting liquid to substantially 20% to 25% by addition of ethanol while maintaining the liquid at a maximum temperature of −5° C., recovering the resulting precipitate containing principally gamma and beta-two globulins, suspending this precipitate in water, adjusting the pH value of the resulting suspension to substantially 5.2 by adding 0.05 M acetic acid to the suspension, stirring the resulting mixture, adjusting the pH value of the mixture to substantially pH 5.5 with 0.05 M disodium phosphate, adjusting the resulting mixture to an ethanol concentration of from substantially 10 to 12%, adding to the resulting mixture sufficient 1 M sodium chloride to give an ionic strength of approximately 0.01, stirring for approximately 30 minutes at −3° C., centrifuging the material at that temperature, removing the resulting precipitate, suspending the precipitate in water at 0° C., adjusting the pH value of the resulting mixture to substantially 7.65 with 0.05 M disodium phosphate, adding sufficient 1 M sodium chloride to bring the ionic strength of the material to approximately 0.1, stirring the resulting mixture, removing insoluble material, adjusting the resulting liquid to an ethanol concentration of substantially 20% by addition of cold ethanol; and recovering the resulting precipitate protein material consisting essentially of beta-two globulins.

JOHN W. WILLIAMS.
HAROLD F. DEUTSCH.

REFERENCES CITED

The following references are of record in the file of this patent:

UNITED STATES PATENTS

| Number | Name | Date |
|---|---|---|
| 2,390,074 | Cohn | Dec. 4, 1945 |

OTHER REFERENCES

Cohn et al.: J. Am. Ch. Soc., vol. 62 (Dec., 1940) pp. 3386 to 3400.

Cohn: Chemical Reviews, vol. 28 (1941) pp. 395 to 417.